United States Patent
Albuzat et al.

(10) Patent No.: US 9,869,182 B2
(45) Date of Patent: Jan. 16, 2018

(54) TURBINE ROTOR FOR AN EXHAUST GAS TURBINE AND METHOD FOR PRODUCING THE TURBINE ROTOR

(71) Applicant: CONTINENTAL AUTOMOTIVE GMBH, Hannover (DE)

(72) Inventors: Ulrike Albuzat, Mannheim (DE); Guenter Muench, Carlsberg (DE)

(73) Assignee: Continental Automotive GmbH, Hannover (DE)

( * ) Notice: Subject to any disclaimer, the term of this patent is extended or adjusted under 35 U.S.C. 154(b) by 589 days.

(21) Appl. No.: 14/389,028

(22) PCT Filed: Mar. 20, 2013

(86) PCT No.: PCT/EP2013/055829
§ 371 (c)(1),
(2) Date: Sep. 29, 2014

(87) PCT Pub. No.: WO2013/143944
PCT Pub. Date: Oct. 3, 2013

(65) Prior Publication Data
US 2015/0078905 A1    Mar. 19, 2015

(30) Foreign Application Priority Data
Mar. 29, 2012  (DE) .......... 10 2012 205 042

(51) Int. Cl.
*F01D 5/02* (2006.01)
*B23K 1/00* (2006.01)
(Continued)

(52) U.S. Cl.
CPC ............ *F01D 5/025* (2013.01); *B23K 1/0018* (2013.01); *B23K 1/0056* (2013.01); *B23K 1/18* (2013.01);
(Continued)

(58) Field of Classification Search
CPC .......... F01D 5/025; F01D 5/026; F01D 5/063; F05D 2300/174; F05D 2300/177;
(Continued)

(56) References Cited

U.S. PATENT DOCUMENTS 2,369,051 A * 2/1945 Huber ..................... F01D 5/063
228/135
2,646,995 A * 7/1953 Thompson ........... B23K 9/0358
228/138
(Continued)

FOREIGN PATENT DOCUMENTS

CN    102120281 A    7/2011
DE    1144538 A    2/1963
(Continued)

OTHER PUBLICATIONS

EPO, Description of WO 2010/139,571 A, retrieved Mar. 2, 2017.*

*Primary Examiner* — Woody Lee, Jr.
*Assistant Examiner* — Jesse Prager
(74) *Attorney, Agent, or Firm* — Laurence A. Greenberg; Werner H. Stemer; Ralph E. Locher (57) ABSTRACT

A turbine rotor for an exhaust gas turbine has a turbine rotor wheel made of a highly heat-resistant metal alloy and a rotor shaft made of steel. A rotor wheel hub and a rotor shaft end are connected to each other in a metallurgical bond by way of a solder connection. The rotor shaft end and/or the rotor wheel hub is formed with a central recess, which acts as a thermal choke. A closing plug is arranged in the respective recess, forming a closed cavity with the recess and closing off the recess toward the respective end face. The solder connection is formed between the end faces of the rotor wheel hub and the rotor shaft, between the closing plug and the rotor wheel hub, and between the closing plug and the rotor shaft.

10 Claims, 4 Drawing Sheets (51) Int. Cl.
- *B23K 1/005* (2006.01)
- *B23K 1/20* (2006.01)
- *F16D 1/027* (2006.01)
- *F01D 5/06* (2006.01)
- *F16D 1/068* (2006.01)
- *B23K 1/18* (2006.01)
- *B23K 101/00* (2006.01)

(52) U.S. Cl.
CPC .............. *B23K 1/203* (2013.01); *F01D 5/026* (2013.01); *F01D 5/063* (2013.01); *F16D 1/027* (2013.01); *F16D 1/068* (2013.01); *B23K 2201/001* (2013.01); *F05D 2220/40* (2013.01); *F05D 2230/237* (2013.01); *F05D 2300/174* (2013.01); *F05D 2300/177* (2013.01); *Y10T 403/479* (2015.01)

(58) Field of Classification Search
CPC ........... F05D 2220/40; F05D 2230/233; F05D 2230/237; F02C 6/12; B23K 1/0018; B23K 1/0056; B23K 1/18; B23K 1/20; B23K 1/203; B23K 2201/001; B23K 15/00–15/10; F16D 1/00; F16D 1/02; F16D 1/027; F16D 1/06; F16D 1/064; F16D 1/068; Y10T 403/472; Y10T 403/473; Y10T 403/475; Y10T 403/477; Y10T 403/478; Y10T 403/479

USPC .............................. 228/245–255; 416/213 R
See application file for complete search history.

(56) References Cited

U.S. PATENT DOCUMENTS

| | | | |
|---|---|---|---|
| 6,007,301 A | 12/1999 | Noda et al. | |
| 7,052,241 B2 | 5/2006 | Decker | |
| 2007/0199977 A1 | 8/2007 | Pollard et al. | |
| 2010/0050633 A1* | 3/2010 | Jennes | B23K 28/00 60/605.1 |
| 2010/0297468 A1* | 11/2010 | Hecht | B23K 35/001 428/615 |
| 2011/0091324 A1* | 4/2011 | Holzschuh | B23P 15/006 416/200 A |

FOREIGN PATENT DOCUMENTS

| | | | | |
|---|---|---|---|---|
| DE | 69724730 T2 | 4/2004 | | |
| DE | 102007048789 A1 | 5/2009 | | |
| DE | 102009034420 A1 | 2/2011 | | |
| EP | 1507062 B1 | 1/2008 | | |
| GB | 808330 A * | 2/1959 | | B23K 9/035 |
| GB | 946461 A | 1/1964 | | |
| WO | 2008039216 A2 | 4/2008 | | |
| WO | 20100036425 A2 | 4/2010 | | |
| WO | WO 2010139571 A1 * | 12/2010 | | B22F 3/225 |

\* cited by examiner

TURBINE ROTOR FOR AN EXHAUST GAS TURBINE AND METHOD FOR PRODUCING THE TURBINE ROTOR

BACKGROUND OF THE INVENTION

Field of the Invention

The present invention relates to a turbine rotor, with a thermal choke at the transition from the turbine rotor wheel to the rotor shaft, for an exhaust gas turbine and to a method for producing the turbine rotor.

Such a turbine rotor consists of a turbine wheel and a rotor shaft as a structural unit and is for example part of the running gear of an exhaust gas turbocharger for the internal combustion engine of a motor vehicle. The turbine rotor serves in an exhaust gas turbocharger for the conversion of exhaust gas energy, contained in the exhaust gas of an internal combustion engine, into rotational energy of the running gear and for the transmission of this rotational energy to a compressor wheel connected to the turbine rotor. With the aid of the compressor wheel, the rotational energy is in turn used for generating an increased pressure of the air supply to the internal combustion engine, and consequently serves for increasing the output and efficiency of the internal combustion engine.

Instead, there may also be coupled to the turbine rotor for example a generator, with the aid of which the rotational energy is converted into electrical energy, which in turn can be used variously.

However, the main area of use at present concerns exhaust gas turbochargers for internal combustion engines in motor vehicles, for which reason, whenever useful for better understanding, hereafter reference is made in the description to exhaust gas turbochargers.

Exhaust gas turbochargers are being used increasingly for increasing the output in motor vehicle internal combustion engines. This is taking place increasingly frequently with the aim of reducing the internal combustion engine in overall size and weight, with the same output or even increased output, and at the same time reducing the consumption, and consequently the emission of $CO_2$, with regard to increasingly stringent legal specifications. The operating principle is that of using the energy contained in the stream of exhaust gas to increase the pressure in the induction tract of the internal combustion engine and thus bring about better filling of the combustion chamber with air-oxygen, and consequently be able to convert more fuel, petrol or diesel, in each combustion process, that is to say increase the output of the internal combustion engine.

An exhaust gas turbocharger has for this purpose a turbine arranged in the exhaust-system branch of the internal combustion engine, with a turbine rotor driven by the stream of exhaust gas and a compressor arranged in the induction tract, with a compressor impeller building up the pressure. The turbine rotor wheel and the rotor shaft are connected to one another in a material-bonded manner and thus form a structural unit. The compressor impeller is fastened to the end of the rotor shaft of the turbine rotor opposite from the turbine rotor wheel for rotation with said shaft, the rotor shaft being rotationally mounted in a bearing unit arranged between the turbine and the compressor. Consequently, the turbine rotor, and via the rotor shaft in turn the compressor impeller, is driven with the aid of the mass flow of exhaust gas and the exhaust gas energy is thus used for building up pressure in the induction tract.

During operation, the turbine wheel is in the hot stream of exhaust gas, and is consequently exposed to very great temperature fluctuations, peak temperatures up to over 1000° C. being reached. At the same time, the turbine rotor rotates at very high rotational speeds of up to 300 000 rpm, whereby the turbine rotor wheel, and in particular the turbine wheel blading, is exposed to very high mechanical loads due to the high centrifugal forces occurring. Furthermore, particularly the mass of the turbine wheel is very important for the dynamic response of the turbine, which is hindered if the turbine rotor wheel is designed with a high mass to match the high loads. Therefore, highly heat-resistant metal alloys are used for the turbine rotor wheels, in order to avoid premature failure during operation. Titanium-aluminum alloys (TiAl alloys or titanium aluminide) or nickel-based alloys (Ni alloys), which are distinguished in particular by their high specific strength at high temperature and a nevertheless low relative density, are being used increasingly for them. In addition, the coefficient of thermal expansion of these highly heat-resistant metal alloys comes very close to that of metals that are usually used in turbine construction, which helps to avoid problems caused by differing heat expansion. In practice, intermetallic mixtures with a main proportion of titanium and aluminum or nickel are used. As also known for example from DE 10 2007 048 789 A1, the specific alloy compositions may well vary and also contain further constituents, and are typically characterized by a proportion of titanium of between 50 and 60% (proportion by weight) and a proportion of aluminum of greater than 25% (proportion by weight). Further constituents may be for example Cr, Nb, B, C or Mo. TiAl alloys form what is known as a γ-TiAl phase (gamma titanium aluminide) with a tetragonal crystal structure and, depending on the proportion of other different phases, are referred to as gamma, duplex or lamellar alloys.

The Ni-based alloys are for example Inco 713 C, Inco 713 LC, MAR-M 246 MAR-M 247, B 1964, IN 100 or GMR-235.

In the following explanations, all of these alloy structures are subsumed altogether under the term "highly heat-resistant metal alloys".

On the other hand, the rotor shaft is part of the mounting system of the turbine rotor and must be able to withstand a high alternating bending load and must have a sufficiently hardened outer layer, at least in the mounting region, to avoid seizing of the bearings. On the other hand, the rotor shafts are not exposed to the same extreme high temperatures as the turbine rotor wheel.

Correspondingly suitable for this use are materials such as steel, in particular structural steel, low- or high-alloy heat-treatment steel, such as for example 42CrMo4 (1.7225), X22CrMoV12-1 (1.4923) or X19CrMoNbVN11-1 (1.4913), or else superalloys such as Inconel or Incoloy (see also DE 10 2007 048 789 A1). These materials are referred to in the following explanations simply and altogether as steel.

In order to be able to use the respective advantages of the corresponding materials, the turbine rotors are therefore produced from the aforementioned components, the turbine rotor wheel of highly heat-resistant metal alloy and the rotor shaft of steel, and must as a consequence be advantageously joined together by means of a material-bonded connection to form a structural unit.

In the case of material-bonded connections, the elements being connected are held together by means of atomic or molecular forces and are inseparable connections that can only be released again destructively. In this context, material-bonded connections are in particular welded connections and brazed connections.

As known for example from DE 697 24 730 T2, the friction welding method known in this context in connection with other material combinations can only be used to a restricted extent. The reason for this is that, if a friction welding method is used, the transformation of the structural steel at the time of cooling down from austenite to martensite causes an expansion of the steel, which brings about a residual stress, and, even if the TiAl has a high rigidity, the formability at room temperature is approximately at a low 1%, and therefore rupturing of the wheels of TiAl can occur. Furthermore, there is a reaction of TiAl with the carbon, C, in the structural steel, whereby titanium carbide is formed at the connection interface, whereby the strength at the interface falls to a critical degree.

To avoid these problems, DE 697 24 730 T2 proposes a brazing method in which a brazing material that has for example an austenitic structure is inserted between the two elements to be connected, the turbine rotor wheel and the rotor shaft. Such a brazing method is also disclosed in WO 2008 039216 A2.

According to DIN 8505 "Soldering and brazing", brazing is a thermal process for joining materials by material bonding, a liquid phase being produced by melting a brazing filler and a connection being created by diffusion of the brazing filler at the boundary surfaces. A further major difference from welding is that the solidus temperature of the base materials of the elements being joined is not reached thereby.

Consequently, this process takes place at lower temperatures than welding and fewer internal stresses are produced in the joint. Furthermore, the use of a corresponding brazing filler as an intermediate material between the elements being connected makes it possible to prevent the formation of microstructures that are detrimental to strength. According to DE 697 24 730 T2, primarily nickel-, copper-, silver- or titanium-based metal alloys are advantageously used as brazing materials.

One specific problem with the use of such turbine rotors is that heat from the turbine rotor wheel running in the hot exhaust gas surrounding it is transferred by heat conduction by way of the connecting joint to the rotor shaft, the material of which is not designed for the same high temperatures. Excessive heating of the regions of the rotor shaft that are close to the bearings must also be avoided, since this can adversely influence the running properties of the bearings.

In order to limit the heat transfer from the turbine rotor wheel to the rotor shaft, it is known from the prior art, for example EP 1 507 062 B1, to arrange cavities in the material between the turbine rotor wheel and the rotor shaft. In the region of the cavity or the cavities, the cross section of the heat-conducting material is reduced, which acts as a choke with respect to the heat conduction.

These cavities are usually produced by introducing a recess in one of the end faces to be connected of the turbine rotor wheel hub or the rotor shaft, for example in the form of a blind-hole bore. However, this in turn reduces the load-bearing connecting surface area of the brazed connection between the turbine rotor wheel hub and the rotor shaft and weakens the mechanical load-bearing capacity of the turbine rotor in this region.

A further problem is that, even with the lower brazing temperatures, the austenite temperature of the steel used for the rotor shaft is exceeded, and as a result a softening of the steel takes place. This problem is all the more serious the wider the heating region around the brazed connection extends, possibly into the bearing regions of the rotor shaft. This is the case in particular with the methods that are usually used for heating, by means of burners, induction coils or even heating ovens. As a result, renewed subsequent, cost- and time-intensive reworking and hardening of the rotor shaft is unavoidable. This is disadvantageous in particular for industrial mass production.

BRIEF SUMMARY OF THE INVENTION

The present invention is therefore based on the object of providing a turbine rotor, consisting of a highly heat-resistant turbine rotor wheel and a steel rotor shaft, for an exhaust gas turbine, in which the heat conduction between the turbine rotor wheel and the rotor shaft is reduced, but there is nevertheless a high mechanical load-bearing capacity of the connection between the turbine rotor wheel and the rotor shaft, without laborious reworking, for example hardening, of the turbine rotor being required. The object is also that of providing a method for producing such a turbine rotor that can be used at low cost industrially, in mass production.

This object is achieved by a turbine rotor as claimed and by a method for producing this turbine rotor with the features as claimed. Advantageous forms and developments that can be used individually or, as long as they are not mutually exclusive alternatives, in combination with one another are the subject of the dependent claims.

The turbine rotor according to the invention for an exhaust gas turbine has a turbine rotor wheel with a rotor wheel hub and a rotor shaft with a rotor shaft end facing the rotor wheel base. The turbine rotor wheel consists of a highly heat-resistant metal alloy and is preferably produced in a customary precision casting process. It has a main body with blading on the front side, and a rotor wheel hub in the form of a portion of a cylinder arranged concentrically on the rear side of the main body.

The rotor shaft consists of steel and is preferably finished for later use and hardened at least in the region of the later bearing locations.

The rotor wheel hub and the rotor shaft end are connected to one another in a metallurgically-bonded manner by means of a brazed connection.

Advantageously used as brazing materials are primarily nickel-, copper-, silver- or titanium-based metal alloys. The turbine rotor according to the invention is also distinguished by the fact that the rotor shaft end or the rotor wheel hub, or else both the rotor shaft end and the rotor wheel hub, respectively have a centrally arranged recess, which acts as a thermal choke at the transition between the turbine rotor wheel and the rotor shaft. The turbine rotor according to the invention is characterized in that a closure plug is arranged in the respective recess in such a way that it forms a closed cavity with the recess and closes off the recess toward the respective end face. For this purpose, the closure plug is preferably formed such that it is adapted to the contour of the recess, but between the wall of the recess and the outer contour of the closure plug there is nevertheless formed a sufficient gap, into which brazing material can penetrate during the brazing process in order to produce the connection.

The brazed connection is formed between the end faces of the rotor wheel hub and the rotor shaft and between the closure plug and the rotor wheel hub and the rotor shaft. In other words, the brazed connection exists both between the opposing end faces of the rotor shaft end and the rotor wheel hub and between the outer lateral surface of the plug and the inner surface of the respective recess in the overlapping region of the two surfaces mentioned and also possibly between the closure plug end face, supplementing the respective end face, and the respectively opposing end face of the rotor shaft end or rotor wheel hub.

The advantages of the turbine rotor according to the invention are in particular that on the one hand a reduced heat conduction between the turbine rotor wheel and the rotor shaft is ensured and on the other hand the strength of the connection is increased decisively by the increased connecting surface area as a result of the closure plug, and consequently there is a high mechanical load-bearing capacity of the connection between the turbine rotor wheel and the rotor shaft.

An advantageous configuration of the turbine rotor according to the invention is characterized in that the highly heat-resistant metal alloy of the turbine rotor wheel is a TiAl alloy or an Ni-based alloy and in that the steel of the rotor shaft is a low-alloy or high-alloy heat-treatment steel or an austenitic steel. This has the advantage that the optimum combination for achieving the required properties can be put together from a large multitude of known materials.

A further advantageous configuration of the turbine rotor according to the invention is characterized in that the brazed connection has been created by means of electron-beam brazing methods. This makes selective control of the brazing process possible, the spatially delimited heat input having the effect that the hardening of the rotor shaft is not impaired in the region of the bearing locations and there is no need for an additional hardening process. These are essential preconditions for use of the turbine rotor according to the invention in mass-produced products, such as for example in turbochargers for internal combustion engines in motor vehicles.

A further advantageous configuration of the turbine rotor according to the invention is characterized in that the closure plug has a recess on at least one side facing the respective cavity, whereby the respective cavity is increased. This has the advantage that the cavity forming the thermal choke is not inappropriately reduced, and the choking effect thereby impaired, by introducing the closure plug, but a sufficiently large overlapping surface area is nevertheless available between the outer lateral surface of the closure plug and the inner wall of the recess for the forming of an increased connecting surface area.

In an advantageous development of the turbine rotor according to the invention, the closure plug is cylindrically formed and has on its outer lateral surface depressions in the form of grooves, slots or knurls, with at least in some proportion an axial extent. The depressions thereby preferably extend over the entire axial length of the closure plug. The profiling of the outer lateral surface thus produced may have a greater or lesser negative component, which forms a corresponding brazing gap between the outer lateral surface and the inner wall of the respective recess. Preferably, in this way there is set a brazing gap width of between 0.05 mm and 0.15 mm, with which the connection achieves the best strength values. The closure plug is preferably produced from the same material as the turbine rotor wheel or the rotor shaft, which makes the choice of brazing material easier.

A closure plug designed in this way has the advantage that it can be produced easily and at low cost, for example from bar material. Even if the closure plug is inserted in the respective recess with a slight press fit, the depressions provided ensure that there is formed a sufficiently wide brazing gap, into which brazing material can penetrate between the outer lateral surface of the closure plug and the inner wall of the recess in order to form the connection. It is also possible in principle to dispense with the depressions, but then it must be ensured in some other way that there is a sufficient brazing gap.

The formation of the respective centrally arranged recess, in the rotor shaft end or in the rotor wheel hub, or both in the rotor shaft end and in the rotor wheel hub, as a blind-hole bore represents a further advantageous configuration of the turbine rotor according to the invention. A recess in the form of a blind hole can be produced easily and with the required accuracy in one operation and additionally makes possible the use of a cylindrical closure plug that can similarly be easily produced.

In a development of the aforementioned configuration of the respective recess as a blind-hole bore, it may be provided that the respective blind-hole bore has an offset, which widens the latter toward the respective end face and acts as a stop for the respective closure plug. In other words, this is a two-step blind-hole bore that has a certain (larger) diameter from the end face to a certain depth, that is to say up to the offset provided, and as from this depth a smaller diameter. In this case, the offset is preferably formed at right angles, so that it can offer a planar stop surface for the closure plug. A recess designed in this way can likewise be produced in one operation, for example with a step milling cutter. A closure plug adapted to the larger diameter can thus be easily inserted up to the stop and has a predetermined position. In an advantageous way, the closure plug is arranged in the respective recess in such a way that it forms a planar surface with the respective end face. Thus, a planar connecting surface area is produced over the entire diameter of the end faces between the turbine wheel hub and the rotor shaft end. Nevertheless, brazing filler also penetrates into the axially extending annular gap between the outer lateral surface of the closure plug and the inner wall of the respective recess in the rotor wheel hub or the rotor shaft end and forms a brazed connection there. The increase in the size of the connecting surface area thus achieved increases the overall stability of the turbine rotor.

As an alternative to the aforementioned configuration of the turbine rotor, a further configuration is characterized in that both the rotor wheel hub and the rotor shaft end have a centrally arranged recess, and a common closure plug is arranged in such a way that it protrudes into the two recesses and closes off both recesses toward the respective end face. As a result, two cavities are provided one behind the other and the choking effect with respect to heat transfer is further increased. In addition, with a correspondingly adapted outer contour of the closure plug, the central arrangement of the recesses brings about a position-determining and possibly centering effect of the two workpieces, the turbine rotor wheel and the rotor shaft, in relation to one another. Nevertheless, brazing filler also penetrates into the axially extending annular gap between the outer lateral surface of the closure plug and the inner wall of the two recesses in the rotor wheel hub and the rotor shaft end and forms a brazed connection there, which increases the overall size of the connecting surface area and achieves the effect already mentioned.

A further advantageous configuration of the turbine rotor is characterized in that both the rotor wheel hub and the rotor shaft end have a centrally arranged recess in the form of a blind-hole bore and in that these recesses respectively have an offset with a certain axial extent, the offset widening the respective blind-hole bore toward the respective end face and acting as a stop for the closure plug. Furthermore, a common closure plug with a certain axial extent is arranged in such a way that in both recesses it stops against the respective offset. The axial extents of the recesses, from the respective end face to the corresponding offset, and the axial extent of the closure plug are dimensioned in such a relationship that a brazing gap with a defined gap width is formed between the end faces of the rotor wheel hub and the rotor shaft. In other words, acting together with the stops in the two recesses of the opposing end faces, the closure plug serves as a spacer between the two end faces, it being possible for an optimum brazing gap width to be set by correspondingly fixing the axial depth of the widened blind-hole bores up to the respective offset and the axial length of the closure plug. In this way, a brazing gap width of between 0.05 mm and 0.15 mm is preferably set. Apart from the advantages already mentioned in relation to the aforementioned configuration, the connecting joints between the turbine rotor wheel and the rotor shaft have the best strength values with brazing gap widths within the stated range.

The features of all the aforementioned configurations can of course be realized individually and in any desired combination with one another, provided that they are not mutually exclusive as alternatives.

The method according to the invention for producing the turbine rotor described above is characterized by the following method steps:

Firstly, a turbine rotor wheel of a highly heat-resistant metal alloy with a rotor wheel hub, a rotor shaft of steel and a closure plug are provided. The turbine rotor wheel is preferably produced in a customary precision casting process and has a main body with blading on the front side, and a rotor wheel hub in the form of a portion of a cylinder arranged concentrically on the rear side of the main body.

This is followed by the introduction of a centrally arranged recess into the rotor shaft end or the rotor wheel hub, or both into the rotor shaft end and into the rotor wheel hub.

There follows the insertion of the closure plug into the recess of the rotor shaft end or the rotor wheel hub.

After the previous step, a brazing material is then applied to one of the end faces of the rotor wheel hub or the rotor shaft and in the region of the closure plug, nickel-, copper, silver- or titanium-based metal alloys advantageously being used.

Then the two workpieces, the turbine rotor wheel and the rotor shaft, are brought together and aligned with one another in a centered manner. This takes place by clamping the workpieces in a device set up for this purpose in such a way that the end-face abutting surface lies directly against the opposing end face of the respectively other workpiece and the brazing material is positioned in the brazing gap.

This is followed by the heating up of the brazing material and the direct end face region of the rotor wheel hub and the rotor shaft in the brazing gap with the aid of an electron beam, up to a predetermined brazing temperature lying above the melting temperature of the brazing material.

After reaching the brazing temperature, this temperature is maintained as constantly as possible over a predetermined time, by means of a controlled supply of energy by the electron beam. This makes it possible for the connecting surface areas to be wetted by the brazing filler, and consequently improves the diffusion process of the brazing filler into the opposing connecting surface areas.

One possibility for carrying out the heating and temperature-maintaining operation is for example that the electron beam is focused in the form of a spot on one portion of the brazing gap, and the turbine rotor, that is to say the turbine rotor wheel and the rotor shaft together, is turned at a predetermined rotational speed about its axis of rotation. The subsequent cooling down of the workpieces has the effect that the molten brazing filler solidifies, whereby the brazed connection between the turbine rotor wheel and the rotor shaft is created.

After the brazing location has set firm, the turbine rotor can be released from the device.

The advantages of the method according to the invention for producing the turbine rotor according to the invention are in particular that a brazed connection of a constant quality and increased strength of the connection between the turbine rotor wheel and the rotor shaft can in any event be achieved. The rapid and spatially delimited introduction of heat allows short process times to be achieved, and no subsequent operation of hardening the rotor shaft is required. These are essential preconditions for use of the method according to the invention in mass production, such as for example in turbochargers for internal combustion engines in motor vehicles.

Summarized once again in brief, the invention relates to a turbine rotor for an exhaust gas turbine and to a method for producing such a turbine rotor, the turbine rotor having a turbine rotor wheel of a highly heat-resistant metal alloy and a rotor shaft of steel, and the rotor wheel hub and the rotor shaft end being connected to one another in a material-bonded manner by means of a brazed connection.

The rotor shaft end and/or the rotor wheel hub have a centrally arranged recess, which acts as a thermal choke, a closure plug being arranged in the respective recess in such a way that it forms a closed cavity with the recess and closes off the recess toward the respective end face, and the brazed connection between the end faces of the rotor wheel hub and the rotor shaft and between the closure plug and the rotor wheel hub and the rotor shaft is formed.

BRIEF DESCRIPTION OF THE SEVERAL VIEWS OF THE DRAWINGS

Specific exemplary embodiments of the invention are explained in more detail below on the basis of the representations in the drawing, in which.

DESCRIPTION OF THE INVENTION

Figure 1:
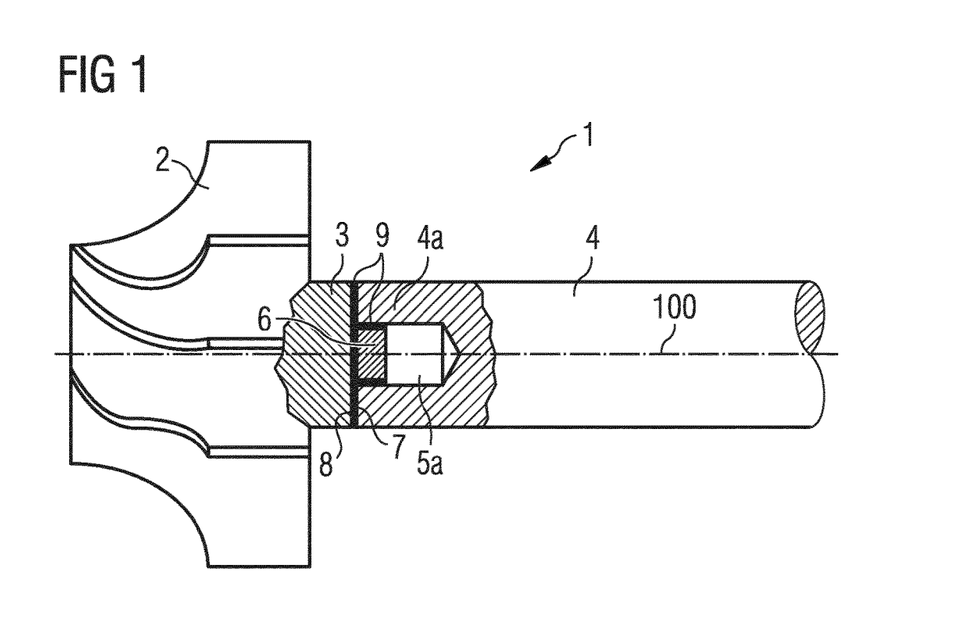
FIG. 1 shows a simplified schematic representation, not to scale, of an embodiment of the turbine rotor according to the invention, with a thermal choke bore in the rotor shaft end, closed by a closure plug.

Items that have the same function and designation are identified in the figures by the same reference signs. In FIG. 1, a turbine rotor 1 according to the invention is shown in a simplified representation. This rotor has a turbine rotor wheel 2 with a rotor wheel hub 3 and a rotor shaft 4. The turbine rotor wheel is preferably produced in a customary precision casting process from a TiAl alloy and has a main body with blading on the front side (on the left in the figure), and also a rotor wheel hub 3 in the form of a portion of a cylinder arranged concentrically on the rear side (on the right in the figure) of the main body. The rotor shaft 4 is likewise represented in a simplified form here and in a specific case may have steps, offsets, tapers and similar features.

The connecting joint between the turbine rotor wheel 2 and the rotor shaft 4 is shown in a "broken-away" representation. A recess in the form of a blind-hole bore 5a, which extends along the axis of rotation 100 of the turbine rotor, has been introduced in the end of the rotor shaft 4 that is facing the rotor wheel hub 3. The blind-hole bore 5a is closed toward the end face 7 of the rotor shaft end 4a by a cylindrical closure plug 6. The closure plug 6 has in this case been introduced precisely so far into the blind-hole bore 5a that the end face 7 of the rotor shaft end 4a forms a planar surface with the outer end face of the closure plug. The brazed connection is formed between the end faces 7, 8 of the rotor wheel hub 3 and the rotor shaft 4 and between the closure plug 6 and the rotor wheel hub 3 and the rotor shaft 4. That is to say in other words that the brazed connection extends in a brazing gap 9 between the opposing end faces 7, 8 of the rotor wheel hub 3 and the planar end face 7, formed by the rotor shaft end 4a together with the closure plug 6, and between the outer lateral surface 6a of the cylindrical closure plug 6 and the opposing inner wall region of the blind-hole bore 5a. The axial extent of the closure plug 6 is less than the axial extent of the blind-hole bore 5a, so that there forms in the rotor shaft end 4a a cavity, which reduces the heat-conducting cross section of the rotor shaft 4 in this region, and thus acts as a thermal choke. In order to ensure that brazing filler can penetrate into the brazing gap 9 between the outer lateral surface 6a of the cylindrical closure plug 6 and the opposing inner wall region of the blind-hole bore 5a for the forming of a brazed connection, the outer lateral surface 6a of the closure plug 6 may have depressions in the form of grooves, slots or knurls, with at least in some proportion an axial extent (in the direction of the axis of rotation 100 of the turbine rotor). This corresponds to a profiling of the outer lateral surface 6a of the closure plug 6, the profile having a greater or lesser negative component with a certain depth, thereby forming a brazing gap 9 with a correspondingly defined gap width, preferably 0.05 to 0.15 mm, into which brazing filler penetrates during the brazing process on account of capillary action. In order to ensure this, the profiling is at least in some proportion aligned axially, that is to say the respective "profile gap" has an extent with a component in the direction of the axis of rotation 100 of the turbine rotor.

Figure 2:
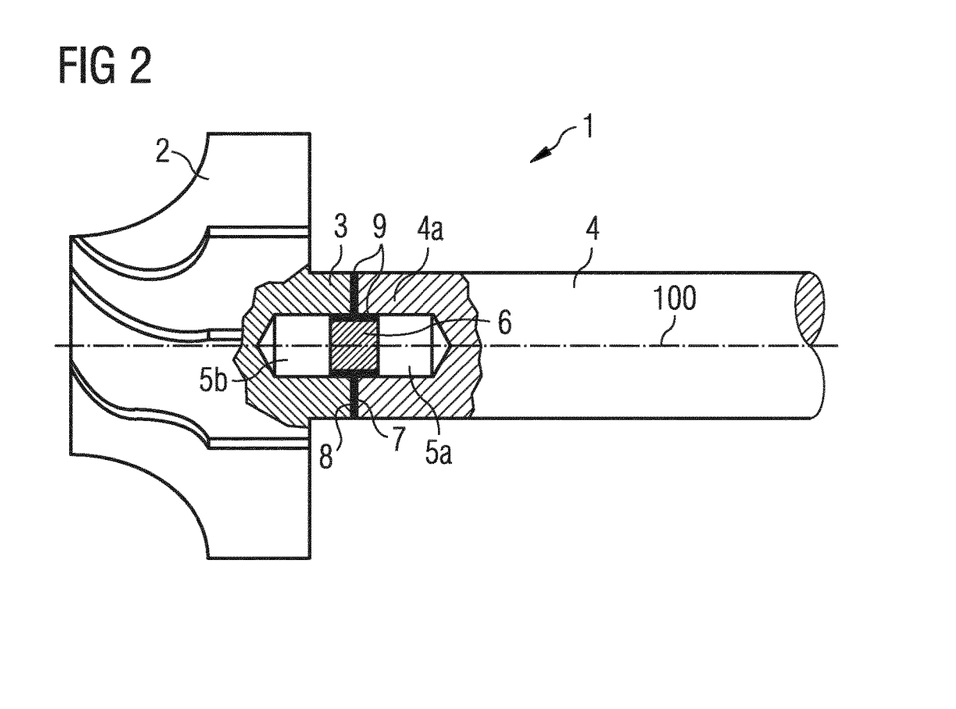
FIG. 2 shows a simplified schematic representation, not to scale, of a further embodiment of the turbine rotor according to the invention, with a thermal choke bore respectively in the rotor shaft end and the turbine wheel hub, closed by a common closure plug.
Figure 3:
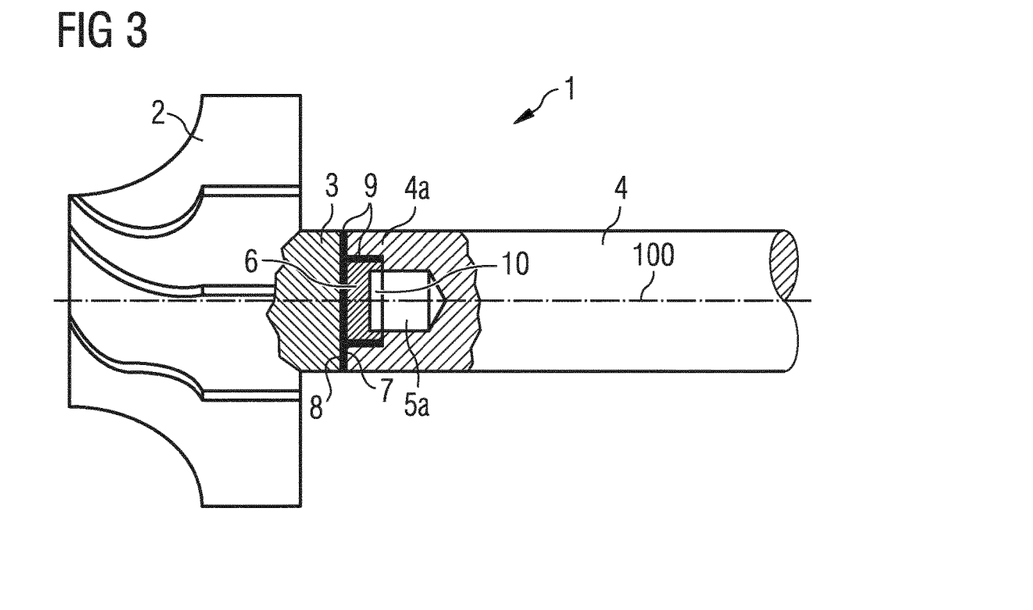
FIG. 3 shows a representation of a further embodiment of the turbine rotor according to the invention, as in FIG. 1, but with a recess in the closure plug and a stop-offset in the thermal choke bore.

FIG. 2 shows another configuration of the turbine rotor 1, which differs from the variant shown in FIG. 1 in that both the rotor wheel hub 3 and the rotor shaft end 4a respectively have a centrally arranged recess in the form of blind-hole bores 5a, 5b, and a common closure plug 6 is arranged in such a way that it protrudes into both blind-hole bores 5a, 5b and closes off both blind-hole bores 5a, 5b toward the respective end face 7, 8. Here, too, the brazed connection is formed between the end faces 7, 8 of the rotor wheel hub 3 and the rotor shaft end 4a and between the closure plug 6 and the rotor wheel hub 3 and the rotor shaft end 4a. This means, however, in this case that the brazed connection extends in a brazing gap 9 between the opposing end faces 7, 8 of the rotor wheel hub 3 and the rotor shaft end 4a, and between the outer lateral surface 6a of the cylindrical closure plug 6 and the respectively opposing inner wall region of the blind-hole bores 5a, 5b in the rotor wheel hub 3 and the rotor shaft end 4a. The heat-choking region is increased considerably as a result. FIG. 3 shows a further configuration of the turbine rotor 1, which differs from the variant shown in FIG. 1 in that the closure plug 6 for its part has a recess 10 on the side facing the cavity formed by the blind-hole bore 5a, whereby the respective cavity is increased, and in that the blind-hole bore 5a has an offset, which widens the latter toward the end face 7 of the rotor shaft end 4a and serves as a stop for the respective closure plug 6.

In other words, the blind-hole bore 5a has a certain (larger) diameter, from the end face 7 of the rotor shaft end 4a, in the direction of the axis of rotation 100 of the turbine rotor, to a certain depth. At this certain depth, the inner wall of the blind-hole bore 5a has a right-angled offset, from which the blind-hole bore 5a extends further with a smaller diameter along the axis of rotation 100 of the turbine rotor to a certain total depth of the blind-hole bore 5a.

The closure plug 6 has a diameter that corresponds substantially to the larger diameter of the blind-hole bore 5a, and is inserted into the blind-hole bore to such an extent that it stops against or rests on the offset formed in the blind-hole bore 5a. In this case, the axial length of the closure plug 6 corresponds to the depth of the blind-hole bore 5a up to the stop-offset, so that the end face of the closure plug 6 forms a planar surface with the end face 7 of the rotor shaft end 4a.

Figure 4:
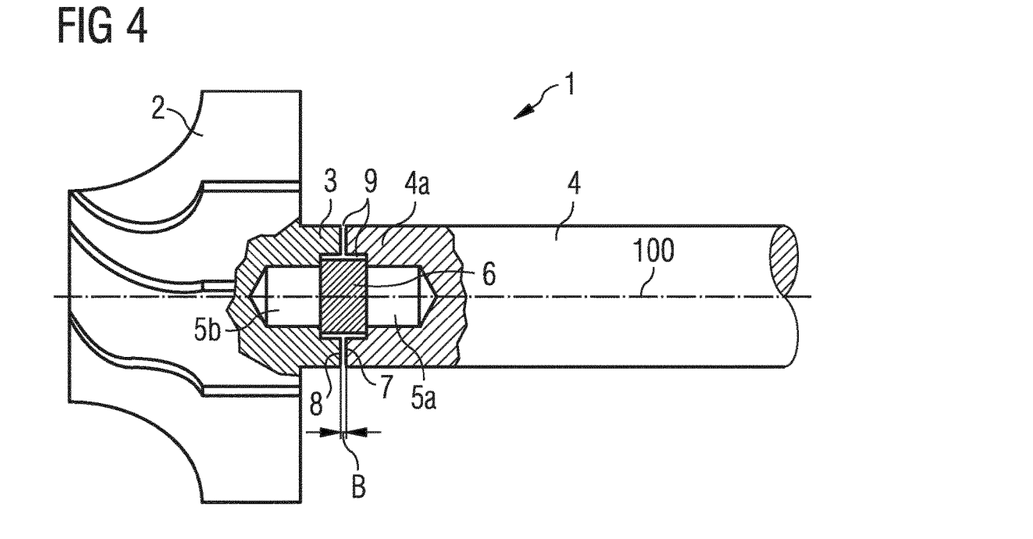
FIG. 4 shows a representation of a further embodiment of the turbine rotor according to the invention, as in FIG. 2, but with a stop-offset respectively in the respective thermal choke bore and a defined gap width of the brazing gap.

FIG. 4 shows a further configuration of the turbine rotor 1, which differs from the variant shown in FIG. 2 in that the blind-hole bores 5a, 5b respectively have an offset with a certain axial extent, which widens the respective blind-hole bore 5a, 5b toward the respective end face 7, 8 and serves as a stop for the closure plug 6, as also described in relation to FIG. 3. This configuration therefore represents a combination of the features from FIG. 2 and FIG. 3. In this case, the common closure plug 6, which has a certain axial extent, is arranged in such a way that, in both blind-hole bores 5a, 5b, it stops against or rests on the respective offset. Furthermore, the axial extent of the offsets, that is to say the depth of the blind-hole bores 5a, 5b from the respective end face 7, 8 in the direction of the axis of rotation 100 of the turbine rotor to the offset, and the axial extent of the closure plug 6 are dimensioned in such a relationship that a brazing gap 9 with a defined gap width B is formed between the end faces 7, 8 of the rotor wheel hub 3 and the rotor shaft 4. To indicate it better, this is shown in FIG. 4 without brazing filler in the brazing gap. The optimum brazing gap width B that can preferably be set in this way lies between 0.05 mm and 0.15 mm.

Figure 5:
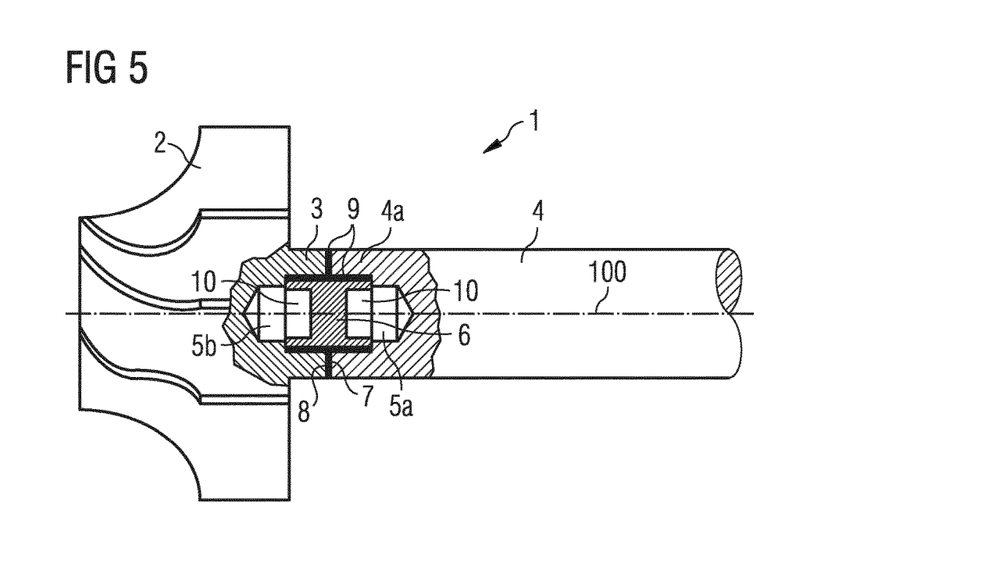
FIG. 5 shows a representation of a further embodiment of the turbine rotor according to the invention, as in FIG. 4, but with a recess respectively on both end faces of the closure plug.

FIG. 5 shows a further configuration of the turbine rotor 1, which largely corresponds to the variant shown in FIG. 4, but differs in that the closure plug 6 has on both sides, in the sides facing the respective cavity, recesses 10, which increase the respective cavity and consequently further enhance the heat-choking effect, without thereby reducing the connecting surface area of the brazed connection.

Figure 6:
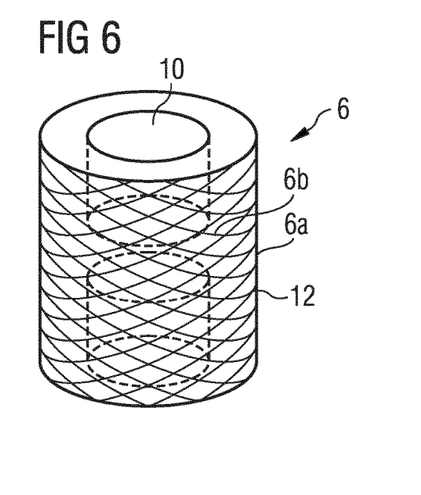
FIG. 6 shows a simplified representation, not to scale, of a closure plug according to FIG. 5, with depressions in the form of knurls on the outer lateral surface.

FIG. 6 shows in a greatly enlarged representation a closure plug 6 such as that used in the case of the configuration of the turbine rotor 1 according to FIG. 5. The closure plug 6 has a cylindrical basic form and has a recess 10 on both end faces. The outer lateral surface 6a of the closure plug 6 has a knurling 6b in the form of an opposing diagonal knurling. The knurled grooves extend here at an angle of about 45° in relation to the longitudinal axis of the closure plug 6 or in relation to the axis of rotation 100 of the turbine rotor, and consequently have an extent that is in some proportion axial.

The outside diameter of the closure plug 6 is in this case preferably dimensioned such that a slight press fit with the blind-hole bore 5a, 5b is obtained. In this way, a prefixed, centered seating of the closure plug in the respective blind-hole bore 5a, 5b is ensured and, in the case of the configurations according to FIGS. 2, 4 and 5, also a mutually centered alignment of the turbine rotor wheel 2 and the rotor shaft 4 in the production/assembly process before creation of the brazed connection, independently of a clamping device. On the other hand, the depressions (negative profile component) of the knurling form channels through which the brazing filler can penetrate in the brazing process between the outer lateral surface 6a and the inner surface of the blind-hole bore 5a, 5b and form a brazed connection.

Figure 7:
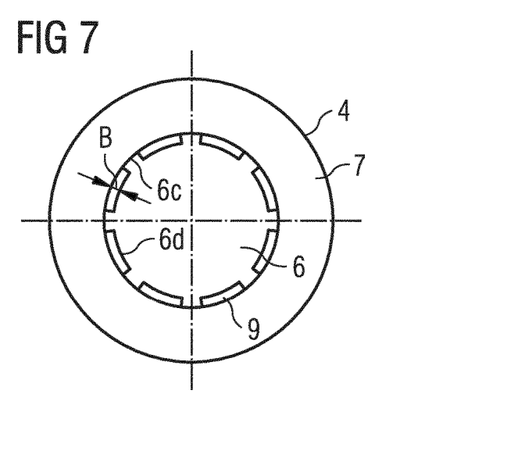
FIG. 7 shows a plan view of the end face of a rotor shaft end with a thermal choke bore and a pressed-in closure plug.

FIG. 7 shows in plan view the end face 7 of a rotor shaft end 4a with an inserted closure plug 6 according to the configuration of the turbine rotor that is shown in FIG. 1. A closure plug with a coarser profiling, in the form of longitudinal slots which extend on the outer lateral surface in the direction of the axis of rotation 100 of the turbine rotor (that is to say 100% in the axial direction), is used here. In this case, depressions 6d (negative component of the profile) and ridges 6c are arranged in uniform distribution over the circumference of the outer lateral surface 6a. The depressions 6d thereby form brazing gaps with a brazing gap width B corresponding to their depth. Here, too, the optimum brazing gap width B that can be set in this way lies between 0.05 mm and 0.15 mm. The greater the negative component here, that is to say the extent of the depressions over the outer lateral surface 6a, the greater the connecting surface area of the brazed connection.

The configurations of the profiling of the closure plug 6 that are shown in FIGS. 6 and 7 and also the stated dimensioning of the diameter for the forming of a press fit can of course also be transferred to other configurations of the closure plug 6 that are shown in FIGS. 1 to 5. The variants of the profiling presented, that is to say the arrangement of depressions on the outer lateral surface of the closure plug, are also not exhaustively presented. In principle, any kind of profiling that extends at least in some proportion in the axial direction and ensures a penetration of brazing filler in the brazing process can be used.

Figure 8:
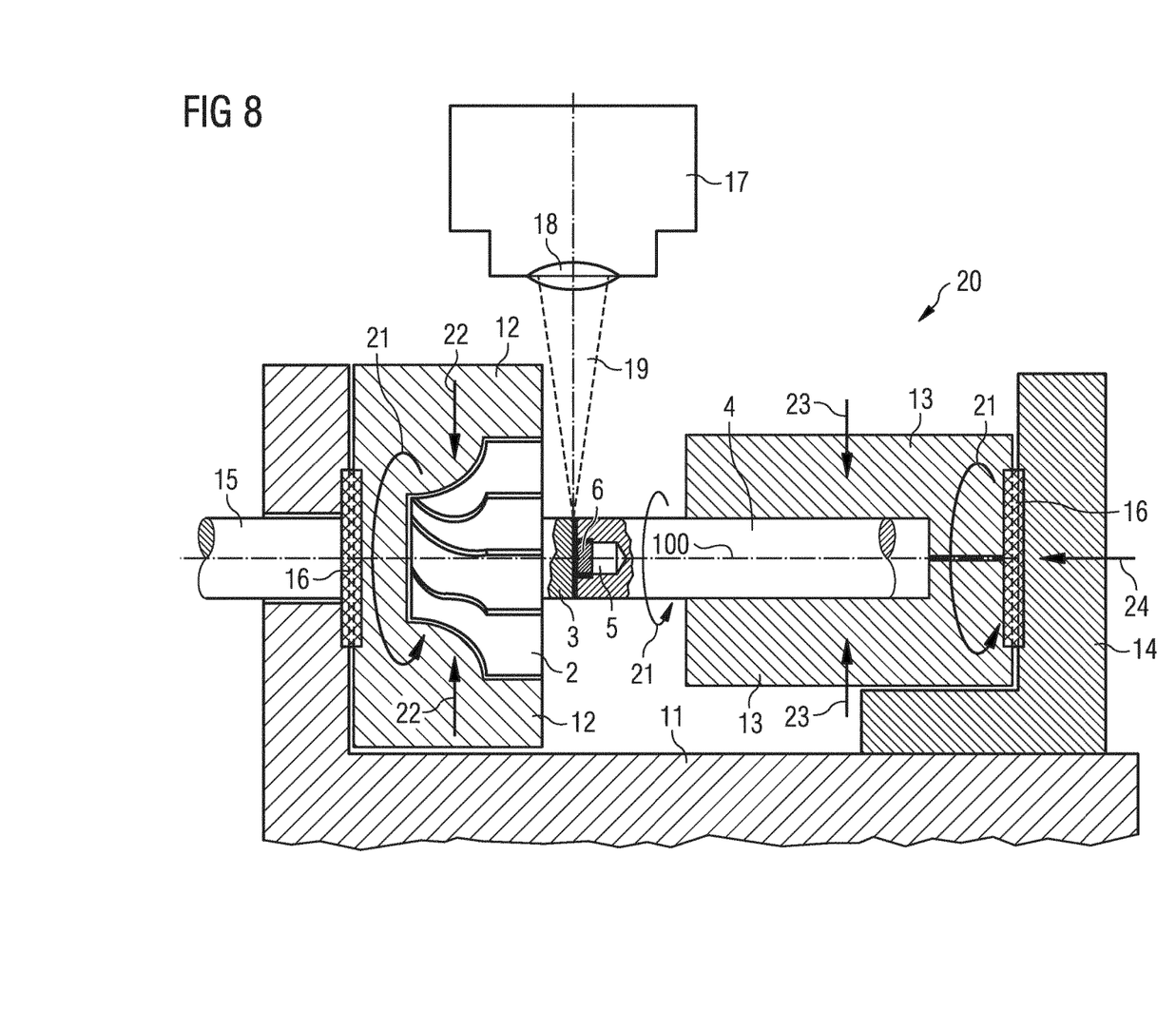
FIG. 8 shows a greatly simplified representation of a device for carrying out at least part of the method according to the invention.

FIG. 8 shows in a greatly simplified representation a device for carrying out various method steps of the method according to the invention. The device represented serves in particular for carrying out the brazing process for the material-bonded connection between the rotor wheel hub 3 and the rotor shaft 4. After separately carrying out the first method steps:

providing the turbine rotor wheel, the rotor shaft and the closure plug, producing a centrally arranged recess respectively in one of the end faces of the rotor wheel hub and/or the rotor shaft and inserting the closure plug into at least one of the recesses of the rotor shaft end and/or the rotor wheel hub applying a brazing material to one of the end faces, at least the following method steps are performed by using a device such as that represented for example in FIG. 8.

The device has a clamping device 20 and an electron beam source 17 with a focusing device 18. The clamping device 20 has the following functional units:

A device bed 11 as a base for the further functional units.

A rotor wheel clamping chuck 12, consisting of at least two clamping jaws for receiving the turbine rotor wheel 2 in a centered manner, the rotor wheel clamping chuck 12 being mounted on the device bed 11 rotatably about the axis of rotation 10 of the turbine rotor by means of a rotary bearing 16 and being capable of being driven by way of a drive shaft 15.

A clamping slide 14, which is mounted in the device bed 11 in such a way that it can be made to move axially, in the direction of the axis of rotation 10 of the turbine rotor.

A rotor shaft clamping chuck 13, consisting of at least two clamping jaws for receiving the rotor shaft 4 in a centered manner and mounted on the clamping slide 14 rotatably about the axis of rotation 10 of the turbine rotor by means of a rotary bearing 16.

The turbine rotor wheel 2 provided, prepared in a way corresponding to the first method steps, is clamped in a centered manner in the rotor wheel clamping chuck 12; the arrows 22 show the clamping movement of the individual clamping jaws that is required for this. Likewise, the rotor shaft provided, prepared in a way corresponding to the first method steps, is clamped in a centered manner in the rotor shaft clamping chuck 13; the arrows 23 show the clamping movement of the individual clamping jaws that is required for this. This is followed by the bringing together of the turbine rotor wheel 2 and the rotor shaft 4, which are aligned with one another in a centered manner, by way of a linear movement of the clamping slide 14, which is indicated in FIG. 8 by means of the arrow 24, in such a way that the respective end-face abutting surface lies directly against the opposing end-face abutting surface of the respectively other workpiece and the brazing material is positioned in the brazing gap 9. Insertion of a common closure plug 6 into the opposing blind-hole bore 5a, 5b of the workpiece positioned opposite is possibly also performed here. The clamping slide 14 then applies a predefined clamping force, with which the two workpieces are pressed against one another. As a consequence, driven by way of the drive shaft 15, the turbine rotor wheel 2, together with the rotor shaft 4 coupled thereto by means of force closure, is then set in rotation at a predetermined, controlled rotational speed about the axis of rotation 100 of the turbine rotor, which is indicated in FIG. 8 by the arrows 21. With the aid of the electron beam source 17 and the focusing device 18, an electron beam 19 is then generated and directed from the outside onto the brazing gap 9. By the uniform turning of the turbine rotor 1 in interaction with the electron beam 19, the heating up of the brazing material and of the direct end face region 7, 8 of the rotor wheel hub 3 and the rotor shaft 4 then takes place in the brazing gap 9, up to a predetermined brazing temperature lying above the melting temperature of the brazing material. In this case, the heating rate and the temperature level to be reached can be influenced by the rotational speed of the turbine rotor 1 and the intensity of the electron beam 19. In order to ensure good wetting of the opposing end faces 7, 8 by the brazing filler, the brazing temperature is thus maintained over a predetermined time, by means of a controlled supply of energy by the electron beam 19 along with a constant rotational speed of the turbine rotor 1. After that, the cooling down of the workpieces takes place, and the associated creation of the brazed connection between the turbine rotor wheel 2 and the rotor shaft 4. The clamping force produced by the clamping slide 14 is thereby maintained at least until the brazing filler solidifies and the connection is stable. Only then is the turbine rotor released from the device.

All of the procedures described can be carried out in an automated manner with the aid of corresponding drive devices and a central programmable open-loop/closed-loop control device. The arrangement of further functional units also allows the foregoing method steps, such as for example the production of the concentrically arranged blind-hole bores, the insertion of the closure plug and the application of a brazing material, to be carried out at least partially in the device described.

The invention claimed is:

1. A turbine rotor for an exhaust gas turbine, the turbine rotor comprising:
   a turbine rotor wheel consisting of a highly heat-resistant metal alloy, said rotor wheel having a rotor wheel hub with an end face;
   a rotor shaft consisting of steel, said rotor shaft having a rotor shaft end with an end face facing toward said rotor wheel hub;
   one or both of said rotor shaft end and said rotor wheel hub having a central recess formed therein configured to act as a thermal choke at a transition between said rotor wheel and said rotor shaft;
   a closure plug disposed in a respective said recess to form a closed hollow cavity in said recess and closing off said hollow cavity in said recess toward the respective said end face and to form a planar surface with the respective said end face; and
   a brazed connection forming a metallurgical bond connecting said rotor wheel hub and said rotor shaft end to one another, said brazed connection being formed of brazing material disposed between said end face of said rotor wheel hub and said end face of said rotor shaft, between said closure plug and said rotor wheel hub, and between said closure plug and said rotor shaft.

2. The turbine rotor according to claim 1, wherein the highly heat-resistant metal alloy of said turbine rotor wheel is a TiAl alloy or an Ni-based alloy and said steel of said rotor shaft is a low-alloy or high-alloy heat-treatment steel or an austenitic steel.

3. The turbine rotor according to claim 1, wherein said brazed connection is a connection formed by electron-beam brazing.

4. The turbine rotor according to claim 1, wherein said closure plug is formed with a recess on at least one side facing the respective said cavity, for increasing a volume of the respective said cavity.

5. The turbine rotor according to claim 1, wherein said closure plug is a cylindrical plug formed, on an outer lateral surface thereof, with depressions selected from the group consisting of grooves, slots, and knurls, each having at least in some proportion an axial extent.

6. The turbine rotor according to claim 1, wherein said central recess in the rotor shaft end and/or in said rotor wheel hub is a blind-hole bore.

7. The turbine rotor according to claim 6, wherein the respective said blind-hole bore is formed with an offset, which widens the bore toward the respective end face and acts as a stop for the respective said closure plug.

8. A method of producing a turbine rotor, the method comprising the following method steps:
   providing workpieces, including a turbine rotor wheel of a highly heat-resistant metal alloy, a rotor shaft of steel, and a closure plug;
   forming a central recess into one or both of an end face of the rotor shaft and an end face of a rotor wheel hub of the turbine rotor wheel;
   inserting the closure plug into the central recess of the rotor shaft end or the rotor wheel hub to form a closed, hollow cavity between the closure plug and a bottom of the recess and to form a planar surface comprised of the closure plug and a respective end face of the rotor shaft or of the rotor wheel hub;
   applying a brazing material to one of the end faces of the rotor wheel hub or the rotor shaft;
   bringing together and centrally aligning the turbine rotor wheel and the rotor shaft by clamping the workpieces in a suitable device, with the end faces of the rotor wheel hub and the rotor shaft lying directly opposite one another and with the brazing material positioned in a brazing gap in between;
   heating up the brazing material and the end face region of the rotor wheel hub and the rotor shaft at the brazing gap with an electron beam, up to a predetermined brazing temperature lying above a melting temperature of the brazing material;
   maintaining the brazing temperature over a predetermined time, by way of a controlled supply of energy by the electron beam;
   cooling down the workpieces and creating the brazed connection between the turbine rotor wheel and the rotor shaft; and
   releasing the turbine rotor from the device.

9. The method according to claim 8, which further comprises, after inserting the closure plug, applying a flux to the two end faces to be connected, of the rotor wheel hub and the rotor shaft, and the closure plug.

10. A turbine rotor for an exhaust gas turbine, the turbine rotor comprising:
    a turbine rotor wheel consisting of a highly heat-resistant metal alloy, said rotor wheel having a rotor wheel hub with an end face;
    a rotor shaft consisting of steel, said rotor shaft having a rotor shaft end with an end face facing toward said rotor wheel hub;
    one or both of said rotor shaft end and said rotor wheel hub having a central recess formed therein configured to act as a thermal choke at a transition between said rotor wheel and said rotor shaft;
    a closure plug disposed in a respective said recess to form a closed cavity in said recess and closing off said recess toward the respective said end face and to form a planar surface with the respective said end face; and
    a brazed connection forming a metallurgical bond connecting said rotor wheel hub and said rotor shaft end to one another, said brazed connection being formed between said end face of said rotor wheel hub and said end face of said rotor shaft, between said closure plug and said rotor wheel hub, and between said closure plug and said rotor shaft.

* * * * *